July 31, 1928.
J. G. NOLEN
1,679,228
METHOD AND APPARATUS FOR TESTING SIGNALING SYSTEMS
Filed Dec. 11, 1924
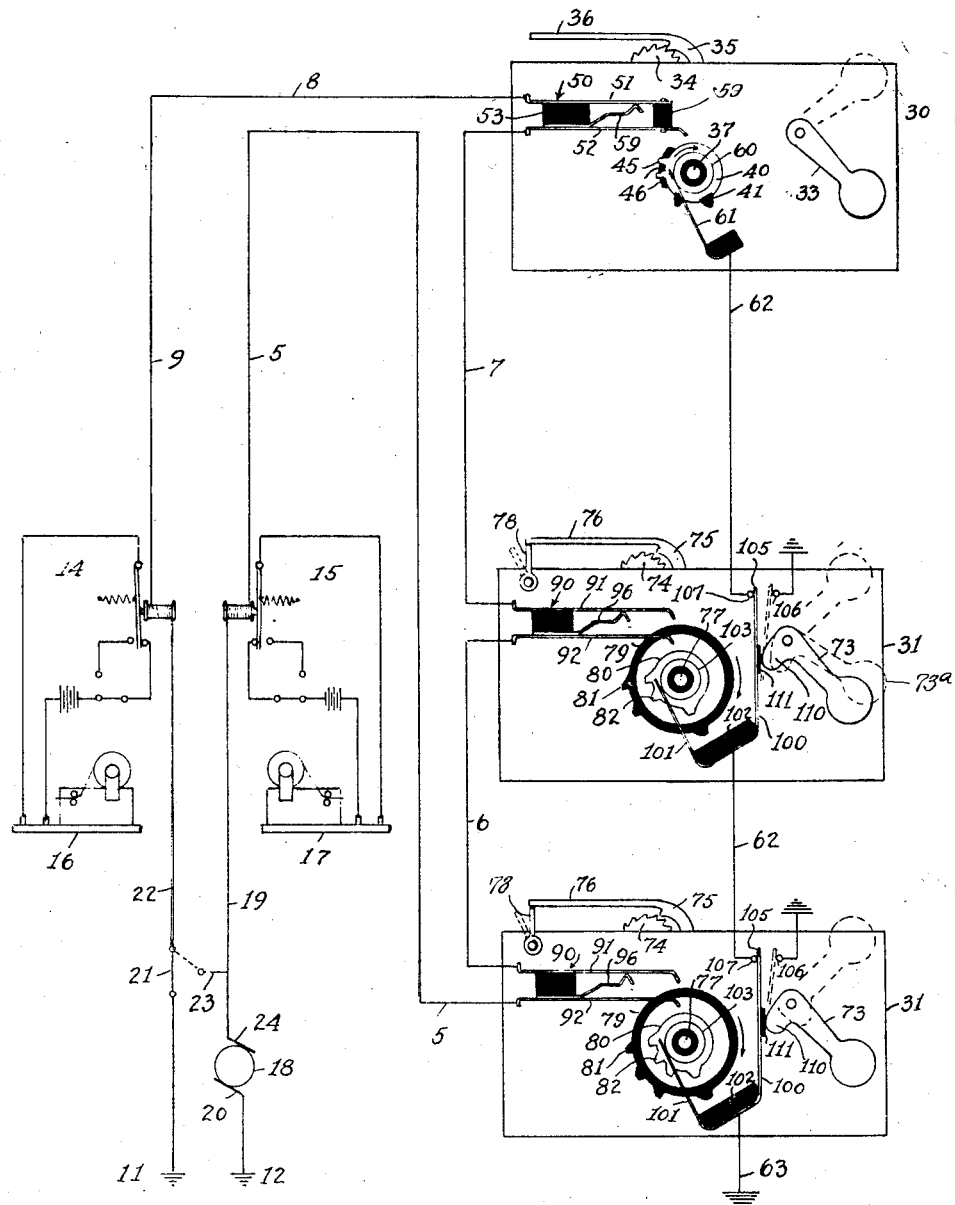
Inventor:
James G. Nolen
By his Atty, Harold D. Penney.

Patented July 31, 1928.

1,679,228

UNITED STATES PATENT OFFICE.

JAMES G. NOLEN, OF NEW YORK, N. Y., ASSIGNOR TO ROBERT L. McELROY, OF CHARLOTTESVILLE, VIRGINIA.

METHOD AND APPARATUS FOR TESTING SIGNALING SYSTEMS.

Application filed December 11, 1924. Serial No. 755,214.

This invention relates to central station electric signaling systems, and more particularly to alarm signaling and to systems using normally wound code signal transmitters, though it is noted that the invention is not limited to alarm signaling, nor in some respects even to normally wound transmitters or to central station systems.

In normally wound alarm transmitter systems and the like where the alarm transmitters must be wound up before the transmitters will operate, it is obvious that all of the alarm transmitter should always be kept wound up, since if such a transmitter is not wound up, a fire in its vicinity would not cause the transmitter to operate and send a fire alarm signal to the central station. Sometimes it happens that the transmitter is not wound up, and it is possible that great loss may be sustained, and in order to avoid this objection, one object of the present invention is to provide a method and apparatus for use in a system of this kind whereby testing signals sent at stated intervals may register signals at the central station showing whether or not all the alarm transmitters of a circuit are fully wound up.

Another object of the invention is to provide an efficient system of this kind operating on a closed circuit but adaptable for operating on an open circuit from either end of the line and through a ground, if the closed circuit should be accidentally broken.

Another object of the invention is to provide a suitable method and apparatus in a system of this kind whereby the ground may be tested at stated intervals and the result of the test recorded at the central station.

Other objects of the invention are to improve generally the simplicity and efficiency of such methods and to provide devices and systems of this kind which are economical to manufacture and convenient to operate and not likely to get out of order.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with an improved signal system which, briefly stated, includes a main or subscriber's line having grounded legs in which registers are interposed, with a generator in one leg between the register and the ground, as is well known. Normally wound master transmitters and individual alarm signal transmitters are interposed in said line, the master transmitter including a signal switch adapted to open the main line to transmit a signal thereto and also adapted to connect the main line to a grounded line passing the individual transmitters to send testing signals therethrough as will be explained. The individual transmitters include a code signal switch and a ground line switch the latter connecting the code signal switch to the ground line and closing the ground line when the transmitter is fully wound, whereby said testing signals may be sent and received by the register to show that the alarm transmitters are fully wound. Said ground switch also serves to connect the code signal switch with a grounded contact, and to break the ground line on the master transmitter side when the transmitter is unwound or unwinding, so that said testing signals may not be sent and received, thereby indicating that some individual transmitter that ought to be wound up is unwound.

The code signal switches of the individual transmitters are adapted to receive current from either adjacent portion of the line and to transmit signals through the ground if there should be a break in the main line.

The figure is a diagram of one of many possible embodiments of the invention.

My improved master transmitter and ground tester is shown in combination with a normally closed main or subscriber's line 5, 6, 7, 8, 9 connecting a central station and a subscriber's station and having both ends grounded at the central station as at 11 and 12. Relays 14, 15 at the central station are respectively interposed in each leg of the line and have associated therewith signal registers 16 and 17 adjustable for operation by the relays on either closed or open circuit. A generator 18 is interposed in one leg 19 of the line between the relay 15 and the ground, whereby one terminal 20 of the generator is grounded. A twoway manual switch 21 interposed in the other leg 22 of the line permits said leg 22 and its relay 14 to be cut off from its ground 11 and connected by the branch conductor 23 to the ungrounded terminal 24 of the generator. This arrangement is well known as is shown in Patent No. 886,879 issued May 5, 1908, to J. Shepherd for signaling systems and is not claimed as new herein.

A master signal transmitter 30 and a plurality of individual signal transmitters 31 all located at the subscriber's station are interposed in said line in series with each other.

The master transmitter comprises a normally wound clockwork having a handle 33 by which the clockwork is wound, an escapement wheel 34, an escapement member 35 for retarding the clockwork, a vibrating stem 36 on the escapement member, and a switch arbor 37 driven by the clockwork and carrying a metal testing disk 40 insulated from said arbor and provided with insulated peripheral code teeth 41. Said testing disk 40 is also provided with line testing ground teeth 45 and insulating blocks 46 between, to the rear and in advance of said teeth.

A contact switch 50 interposed in said line includes a spring contact member 51 and a spring contact member or pen 52 both mounted on a block 53 and respectively connected with the adjacent portions 8 and 7 of the line, the pen 52 being normally out of contact with the disk 40, and adapted to be contacted by said teeth 41 and 45. An insulating member 59 mechanically connects the free ends of said members 51 and 52 to cause them to move in unison. A bridging spring contact 59 secured and electrically connected to the fixed end of said pen 52 and engaging near the outer end of the member 51 electrically connects them and closes said switch except when said pen is engaged by the teeth.

An annular contact member 60 connected to said metal disk 40 is engaged by a brush 61 connected to a secondary or grounded line 62 passing said individual transmitters 31 and grounded at the other end as at 63.

The master transmitter normally operates on a closed circuit and when the teeth 41 engage the pen 52, the member 51 separates from the contact 59, whereby the circuit is broken and the code signal of the teeth 41 is recorded at both registers 16 and 17, the relays 14 and 15 being set for operation on a closed circuit.

The master transmitter is wound and released at stated intervals, for instance, at closing and opening time of a factory. The master code signal produced by the teeth 41 is recorded as stated by the registers 16 and 17, thus showing that the line is in order and which subscriber's station is being tested.

Between these code signals, the ground testing signals of the teeth 45 are given. The first insulating block 46 engages the pen 52 and raises the contact member 51 breaking the circuit, then the ground testing teeth 46 engage the pen 52 permitting current to pass from the terminal 24 through the relay 15, the line portions 5 and 6, the switches 90, the line portion 7, the pen 52, the teeth 45 and the grounded line 62 and ground 63, if the grounded is completely closed, thus showing on the register 17 that the ground 62, 63 is perfect and that the subscriber's transmitters are wound up, as will be explained.

Each individual transmitter 31 comprises a normally wound clockwork having a handle 73 by which the clockwork is wound, an escapement wheel 74, an escapement 75 for retarding the clockwork, a vibrating stem on the escapement, and a switch arbor 77 driven by the clockwork, all here shown the same as in the master transmitter. Each individual transmitter also includes a pivoted releasing device 78 or other equivalent means engaging said stem to prevent the unwinding of the clockwork except when the device is moved to the position of the dotted lines as by a fire-, water-, burglar-alarm or the like, suitably connected thereto.

A toothed disk 79 of insulating material and a toothed metal disk 80 mounted on said arbor 77 and adapted to rotate in the direction of the arrows are provided with peripheral code teeth 81, 82 almost in radial alinement, the teeth 82 of the metal disk being slightly in advance of those of the disk 79. A contact switch 90 interposed in said subscriber's line includes a pair of insulated spring contact pens 91 and 92 respectively connected with the adjacent portions 7 and 6 or 6 and 5 of the line and normally out of contact with said disks 79, 80 and adapted to be respectively contacted by said teeth 81, 82 of the respective disks 79, 80. A bridging contact 96 secured to the fixed end of one said pen 92 and engaging near the outer end of the other pen 91 connects the pens and closes the switch except when said pen 91 is raised by said teeth 81, which breaks the contact between the pen 91 and the contact 96, thus breaking the circuit and causing the registers 16 and 17 to record.

A ground switch 100 interposed in said grounded line 62 includes an insulated switch spring 101 fixed at an intermediate part on an insulating block 102 and connected to the adjacent portion of the grounded line 62 toward the ground side and having one free end engaging a ring 103 insulated on the arbor 77 and electrically connected to said disk 80. The movable free end 105 of the spring is adapted to spring against a grounded contact 106. A ground line contact 107 connected to the other adjacent portion of the grounded line 62 toward the master transmitter side is also engageable by said movable end 105.

A projection 110 on said handle 73 is adapted, when the clockwork is fully wound, to engage an insulating plate 111 on said movable end 105 and press said movable end out of engagement with said grounded contact 106 and into engagement with said ground line contact, whereby the grounded line 62 is made complete only when all of the individual transmitters are fully wound. Whenever the clockwork is unwinding, as shown by the position 73ª of the handle or unwound, the ground line 62 is broken and said movable end moves into contact with the grounded contact 106, and the contact ring is thereby connected to the grounded contact. Thus when the action of the ground testing teeth 45 shows the ground line to be complete, all of the transmitters are surely wound up and both toothed disks 80 of all of the individual transmitters are grounded on the grounded line 62.

When all of the individual transmitters are wound up except the one that is unwinding, the individual transmitter which is unwinding is grounded through the spring 101 both on the grounded line 62 and on its individual grounded contact 106. If the lower transmitter 31 is unwound, and the grounded line 62 thereby broken, the upper individual transmitter 31, when it is unwinding, will still be grounded on its individual grounded contact 106.

If the circuit be accidentally broken, as, for instance, at 5, 6, 7 or 8, the switch 21 may be thrown to connect with the conductor 23, and the current may pass to either the pen 91 or 92. If the break is between the pen 92 and the generator, the current will pass through the relay 14 to the pen 91 and thence through the contact 96 to the pen 92, and then through the disk 80, the spring 101 and the grounded contact and record on register 16. Since, as stated, the teeth 82 are slightly in advance of the teeth 81, the above actions will take place before the teeth 81 have time to engage the pen 91 and break the contact between the pen 91 and the contact 96.

If the break is between the pen 91 and the generator, the current will pass the relay 15 to the pen 92, and thence through the teeth 82, disk 80, spring 101 and the grounded contact 106, and record on the register 17. In either case, should the contact 106 become defective or not perfectly grounded, the current would still have a path through the grounded line 62, 63 if the latter be unbroken between the particular transmitter and the ground.

I claim as my invention:

1. In combination, a main line; a signal receiving device and a generator in said line; a master transmitter and normally wound individual transmitters interposed in said line; a secondary line passing said individual transmitters; said master transmitter including means adapted to connect the main line with the secondary line and to send testing signal current through the latter; and a switch in each individual transmitter for completing the secondary line when the transmitter is wound and breaking the secondary line when the transmitter is unwound.

2. In combination, a subscriber's line having a grounded leg; a register and a generator in said leg; a master transmitter and normally wound individual transmitters interposed in said line; a grounded line passing said individual transmitters; said master transmitter including a signal switch comprising means adapted to connect the main line with the ground line and to send testing signal current through the latter; and a ground switch in each individual transmitter for completing the grounded line when the transmitter is wound and breaking the grounded line when the transmitter is unwound or unwinding.

3. In combination, a main line having a grounded leg; a signal receiving device and a generator in said leg; normally wound individual transmitters interposed in said line; a grounded line through which testing signal current may be sent; each individual transmitter including a code signal switch, a grounded contact, and a ground switch comprising means for closing the grounded line and connecting the code signal switch to the grounded line when the transmitter is wound and connecting said switch to the grounded contact and the grounded line and breaking the grounded line when the transmitter is unwound or unwinding.

4. In combination, a subscriber's line having a grounded leg; a register and a generator in said leg; a master transmitter and normally wound individual signal transmitters interposed in said line; and a grounded line passing said individual transmitters; said master transmitter including means adapted to send testing signal current through the grounded line; each signal transmitter including a code signal switch, a grounded contact, and a ground switch comprising means for closing the grounded line and connecting the code signal switch to the grounded line when the transmitter is wound and connecting said switch to the grounded contact and breaking the grounded line when the transmitter is unwound or unwinding.

5. In combination, a main line having grounded ends; a register and a generator in one leg of the line; a grounded line; transmitters interposed in the main line each including a toothed disk, a code-signal switch in said main line engageable by said teeth to open the switch, a grounded contact, a switch member connected to said toothed disk and the single grounded line, and means controlled by the transmitter for connecting said switch member to the grounded contact when the transmitter is unwound or unwinding, whereby if any point of the main line is broken, code signal current may be sent through said grounded line or grounded contact to the register.

6. In combination, a main line; signal receiving means, a generator and individual transmitters interposed in said line; a grounded line; means for sending testing signal current through said grounded line; each individual transmitter including an arbor, an insulated toothed disk, and a metallic toothed disk on said arbor insulated therefrom, each provided with code teeth in approximate radial alinement, the teeth of the metallic disk being slightly in advance of the others; a switch interposed in said line including a pair of insulated pens normally out of contact with said disks and engageable by said teeth; a bridging contact secured to the pen engaging the more advanced teeth and adapted to engage the other pen except when said pens are raised; an individual grounded contact; a switch spring connected to the grounded line on the ground side and to said metallic disk and having a movable end adapted to spring against said grounded contact; a grounded line contact connected to the grounded line on the side away from the ground side and engageable by said movable end; and means adapted when the transmitter is wound to press said movable end away from said grounded contact and into engagement with said grounded line contact.

7. In combination, a line having grounded ends; a register and a generator in one leg of the line; normally wound master and individual transmitters interposed in said line; said master transmitter including a rotary metal disk provided with code teeth, and a switch in said line engageable by said teeth to open the switch; and a grounded line connected to said disk and passing the individual transmitters; each individual transmitter including a metallic toothed disk, a switch in said line engageable by the teeth of said metallic disk to open the switch, a grounded contact, a switch member connected to said metallic disk and the grounded end of the grounded line, and means controlled by the transmitter for connecting said switch member to the live end of the grounded line when the transmitter is wound and to the grounded contact when the transmitter is unwound or unwinding.

8. In combination, a subscriber's line having both ends grounded; registers interposed in each leg of the line; a generator in one leg between the register and the ground; a switch whereby the other leg may be cut off from its ground and connected to the ungrounded terminal of the generator; a master and individual transmitters interposed in said line, each having a winding handle; said master transmitter including a toothed metal disk provided with code teeth and ground testing teeth and an insulating block to the rear and in advance of said testing teeth, a contact switch in said line including a pen engageable by said teeth to open the switch; and a grounded line connected to said disk and passing said individual transmitters; each individual transmitter including an insulated disk and a metallic disk each provided with code teeth, a normally closed switch in said line engageable by said teeth to open the switch, a grounded contact, a switch spring connected to said metallic disk and to the grounded line on the ground side and normally engaging said grounded contact, a grounded line contact connected to the ground line on the master transmitter side, and means adapted when the transmitter is wound to press said switch spring away from said grounded contact and into engagement with said grounded line contact.

9. In combination, a main line; a normally wound transmitter connected to said main line; a secondary line; means for sending code signal testing current through the secondary line; the transmitter including a signal switch means completing the secondary line and connecting the signal switch to the secondary line when the transmitter is wound and breaking the secondary line when the transmitter is unwound or unwinding.

10. In combination, a main line; a normally wound transmitter connected to said main line; a secondary line; means for sending testing current through the secondary line; said transmitter including a signal switch normally disconnected from the secondary line, and means completing the secondary line and connecting the signal switch to the secondary line when the transmitter is fully wound and breaking the secondary line when the transmitter is unwinding.

11. In combination, a main line; a normally wound transmitter interposed in said main line; a secondary line connected to a ground; testing means adapted to send testing signal current through the secondary line; said transmitter including a code signal switch, normally disconnected from the secondary line, and means completing the grounded line and connecting the code signal switch to the secondary line when the transmitter is wound and breaking the secondary line and disconnecting the testing means from the ground when the transmitter is unwound.

12. In combination, a constantly closed transmitting circuit including a main line and a normally wound transmitter interposed in said main line; a secondary line passing said individual transmitters; means adapted to send testing signal current through the secondary line; said transmitter including a code signal switch and means completing the secondary line and connecting the code signal switch to the secondary line when the transmitter is wound and breaking the secondary line when the transmitter is unwound.

Signed at New York in the county of New York and State of New York this 10th day of December, A. D. 1924.

JAMES G. NOLEN.